US011786980B2

(12) United States Patent
Pikarski et al.

(10) Patent No.: US 11,786,980 B2
(45) Date of Patent: Oct. 17, 2023

(54) APPARATUS FOR FORMING A CHANNEL IN A WORKPIECE

(71) Applicant: Power Box AG, Zug (CH)

(72) Inventors: Daniel Pikarski, Somerset (GB); Wolf Wang, Somerset (GB)

(73) Assignee: Power Box AG, Zug (CH)

( * ) Notice: Subject to any disclaimer, the term of this patent is extended or adjusted under 35 U.S.C. 154(b) by 92 days.

(21) Appl. No.: 17/359,987

(22) Filed: Jun. 28, 2021

(65) Prior Publication Data
US 2021/0402490 A1 Dec. 30, 2021

(30) Foreign Application Priority Data
Jun. 26, 2020 (GB) ..................................... 2009813

(51) Int. Cl.
*B23B 47/28* (2006.01)
*B27C 3/06* (2006.01)

(52) U.S. Cl.
CPC ........ *B23B 47/287* (2013.01); *B23B 2247/10* (2013.01); *B27C 3/06* (2013.01)

(58) Field of Classification Search
CPC ..... B23B 47/287; B23B 2247/10; B27C 3/06; Y10T 408/385; Y10T 408/6786; Y10T 408/91; Y10T 408/935
See application file for complete search history.

(56) References Cited

U.S. PATENT DOCUMENTS

| 2,444,562 | A | * | 7/1948 | Fried | .................. | B23Q 5/54 |
| | | | | | | 408/136 |
| 2,571,862 | A | * | 10/1951 | Glenn | .................. | B27C 3/08 |
| | | | | | | 173/147 |
| 4,917,549 | A | * | 4/1990 | Geernaert | ............. | B23B 47/287 |
| | | | | | | 408/112 |
| 7,374,373 | B1 | * | 5/2008 | Park | .................. | B23B 41/00 |
| | | | | | | 408/46 |

(Continued)

FOREIGN PATENT DOCUMENTS

| EP | 3391984 A1 | 10/2018 |
| EP | 3444058 A1 | 2/2019 |

OTHER PUBLICATIONS

European Search Report from related EP21275065 dated Nov. 18, 2021 (pp. 2).

*Primary Examiner* — Eric A. Gates
(74) *Attorney, Agent, or Firm* — Woodard, Emhardt, Henry, Reeves & Wagner, LLP

(57) ABSTRACT

An apparatus for the formation of a channel in a workpiece located at a first face of a base of the body of the apparatus, the channel formed by a drill assembly of the apparatus connected to drive means located on a second opposing side of the base, the drill assembly and drive means mounted so as to be movable in a guided manner with respect to the base. The movement is achieved by manual movement of a gripping means of an actuation means of the apparatus with respect to the base, so as to cause one or more flexible connecting members of the actuation means which are (Continued)

positioned intermediate the gripping means and drill assembly to move and advance the drill assembly towards the workpiece. The channel is formed in accurate manner which then allows the same to receive securing means typically to allow a joint between first and second workpieces to be accurately formed.

19 Claims, 6 Drawing Sheets

(56) References Cited

U.S. PATENT DOCUMENTS

| | | | |
|---|---|---|---|
| 8,087,853 B2* | 1/2012 | Stukuls | B27C 3/04 |
| | | | 408/136 |
| 9,682,430 B2* | 6/2017 | Clark | B23B 47/288 |
| 10,766,079 B2* | 9/2020 | Pikarski | B23B 47/287 |
| 10,967,440 B2* | 4/2021 | Hill | B23B 47/28 |
| 11,117,286 B2* | 9/2021 | Yates | B27C 3/08 |
| 2019/0030619 A1 | 1/2019 | Thackery | |
| 2019/0054547 A1* | 2/2019 | Pikarski | B25H 1/0057 |

* cited by examiner

APPARATUS FOR FORMING A CHANNEL IN A WORKPIECE

CROSS-REFERENCE TO RELATED APPLICATIONS

This application claims the foreign priority benefit of United Kingdom Patent Application No. 2009813.3 filed Jun. 26, 2020, which is hereby incorporated by reference.

BACKGROUND

The invention to which this application relates is apparatus which can be used in order to form one or more channels in a workpiece, such as a workpiece made of wood and, furthermore, to be able to be use the apparatus to repeatedly form one or more channels with the said channels which are formed being substantially uniform in terms of length, dimension and/or angular arrangement with respect to the workpiece or workpieces.

The need to be able to form a series of channels in a workpiece, such as a workpiece which is to form part of an item of furniture, in order to allow the workpieces to be subsequently connected together as a joint, such as a right angled joint, is well known. In order to be able to provide a secure and neat joint, it is desired that the said channels which are formed, are spaced apart along, and adjacent to an edge of the respective workpieces and for the same to be formed in a uniform manner. Typically, the channel is required to be of a particular length to receive the securing means such as a screw, which is subsequently screwed into and along the channel so that the same passes through the workpiece from a first surface to a second surface which is substantially perpendicular to the first surface so that the securing means enters the workpiece at the first surface and protrudes through the said second surface and moves into the second workpiece and is provided at an angle with respect to said first and second surfaces of the first workpiece and allows a securing effect to be obtained between the said workpieces. When these requirements are met the joint which is formed between the two workpieces, maintains the workpieces to lie at the required angle with respect to each other.

In order to achieve this type of joint it is known to provide a jig apparatus which can be fitted to a said workpiece and, with the workpiece clamped in position, a drill is used to form the channel into the workpiece and is guided by the jig as it is moved into the workpiece to form the said channel. The jig apparatus can be provided in different forms, such as to allow a single channel to be formed on each use, or, to form a number of channels during each use of the jig apparatus in a specific location, with a series of guides provided at a spaced relationship in the apparatus.

Although the use of apparatus of this type is well known and is of advantage in comparison to the freehand forming of channels, there are problems in that the jig apparatus can be difficult to fit to the workpiece in the required position on the workpiece and, this is especially the case when one considers that the person may be required to simultaneously locate the jig apparatus and use a separate powered drill apparatus to form the channel. As a result, the accuracy of the channels which are formed, is often less than is desired or expected and causes problems in forming the joint.

It is also known to provide more complex jig apparatus which retains the workpiece and performs the drilling operation automatically, or at least semi-automatically, and thereby reduce the direct involvement of the user and this can increase the accuracy of the channels which are formed. However, this form of apparatus tends to be relatively expensive due to its complexity and is often of a large size which means that the apparatus is not suitable for use in a domestic premises or for use in forming a relatively small volume of channels and is not easily transportable As a result of this, the use of the relatively complex automatic or semi-automatic apparatus is limited and tends to be reserved for specialists or commercial companies.

SUMMARY

An aim of the present invention is to provide apparatus which allows for the improved accuracy of formation of a channel in a workpiece and which allows the formation of the channel to be performed in a reliable and repeatably accurate manner.

A further aim is to provide the apparatus in a form which allows the same to be available for use by an amateur operator and/or in relatively confined spaces and, furthermore, to allow the apparatus to be provided in a form which is economically viable in terms of the price of purchase for the required level of usage of the same.

A yet further aim is to provide the apparatus in a form which allows the creation and forming of accurate and neat joints between respective workpieces.

In a first aspect of the invention there is provided apparatus for the formation of a channel into a workpiece, said apparatus including a body with a face against which the said workpiece is located during use to form said channel, a drill assembly which, when operated, rotates a drilling head used to form the said channel, and actuation means wherein movement of said actuation means causes the said drilling head to be advanced towards and into the said workpiece in a guided manner to form said at least one channel.

Typically, the drill head is formed by a drill bit which is removably secured to a drive shaft and forms the drill assembly. Typically the shaft is located with a drive means which causes rotation of the same when switched on. Typically the drill assembly is movable relative to the body of the apparatus along guide members mounted on the body. Typically the drive means is movable along with the said drill assembly.

In one embodiment, the apparatus is provided to allow the formation, simultaneously, of multiple channels at spaced locations on the workpiece. Typically the apparatus includes an equal number of drill heads and drive shafts to the number of channels.

Typically, in whichever embodiment, the said channel which is formed enters a first surface of the workpiece and exits through a second surface of the workpiece to form a channel through the workpiece. In one embodiment the said first and second surfaces are perpendicular.

In one embodiment, the apparatus is portable so as to allow the apparatus to be moved to a required position on the workpiece for use or alternatively, for the workpiece to be moved relative to the apparatus and for the apparatus to be carried to a location for use.

In one embodiment, the channel which is formed in the workpiece is that which is known as a pocket hole.

Typically the apparatus includes a positioning means so as to enable the workpiece to be located against the same and the positioning means are adjustable so as to allow the channel which is formed to be at the appropriate location on the workpiece. Typically the adjustment of the positioning means allows the depth of the workpiece to be taken into account when positioning the apparatus with respect to the same.

In one embodiment the actuation means includes a gripping means portion which is slidingly movable with respect to a base of the body and one or more connecting members which, when said gripping means is moved, exert a movement force on the drill assembly to move the drill head into the workpiece.

Typically the said gripping means of the actuation means is located on guide means in the form of, in one embodiment spaced apart pillars, which depend upwardly from the base. Typically the movement of the gripping means in a direction towards the base causes movement of the connecting members and advancement of the drill assembly towards the workpiece.

Typically the gripping means and/or drill assembly is biased so that when the movement force is removed from the actuation means gripping means the biasing means move withdraw the drill assembly in a direction away from the workpiece.

In one embodiment the actuation means are biased to a position at which the drill head of the drill assembly is withdrawn from the workpiece and located within the envelope of the base of the body.

In one embodiment the actuation means include connecting members which are flexible, such as cords or chains, with a first end connected to the actuation means and the opposing end connected to the drill assembly and passing around at least one contact location on the base.

In one embodiment the at least one contact location includes a pulley wheel located on a member of the body of the apparatus. In one embodiment the gripping means is movable along a plurality of spaced apart pillars which depend upwardly from the base of the body.

In one embodiment the actuation means include one or more springs, typically located in one or more of the said pillars so as to bias the gripping means in a direction away from the said base of the body.

In one embodiment the underside of the base includes a portion for the collection of dust and debris created during the formation of the channel in the workpiece. In one embodiment the said portion includes a passage which allows the movement of said dust and debris from said portion to a location external of the apparatus.

In one embodiment said passage has an entrance on the underside of the base and an exit at another face of the said base.

Typically said motor of the drive assembly is powered by electricity supplied from a mains supply or one or more power cells mounted on the body.

In a further aspect of the invention there is provided apparatus for the formation of a channel in a workpiece located at a first face of a base of the body of the apparatus, said channel formed by a drill assembly of the apparatus connected to drive means located on a second opposing side of the said base, said drill assembly and drive means mounted so as to be movable in a guided manner with respect to said base wherein said movement is achieved by manual movement of a gripping means of an actuation means of the apparatus with respect to said base, so as to cause one or more flexible connecting members of the actuation means which are positioned intermediate the said gripping means and drill assembly to move and advance the said drill assembly towards the said workpiece.

In one embodiment the said connecting members engage with the drive means which in turn moves the drill assembly.

In one embodiment the release of the gripping means allows the gripping means to move to a position in which the connecting members withdraw the drill assembly in a direction away from the workpiece and a drill head of the drill assembly into the base.

BRIEF DESCRIPTION OF THE DRAWINGS

Specific embodiments of the invention are now described with reference to the accompanying drawings; wherein.

DETAILED DESCRIPTION OF THE DRAWINGS

Figure 1:
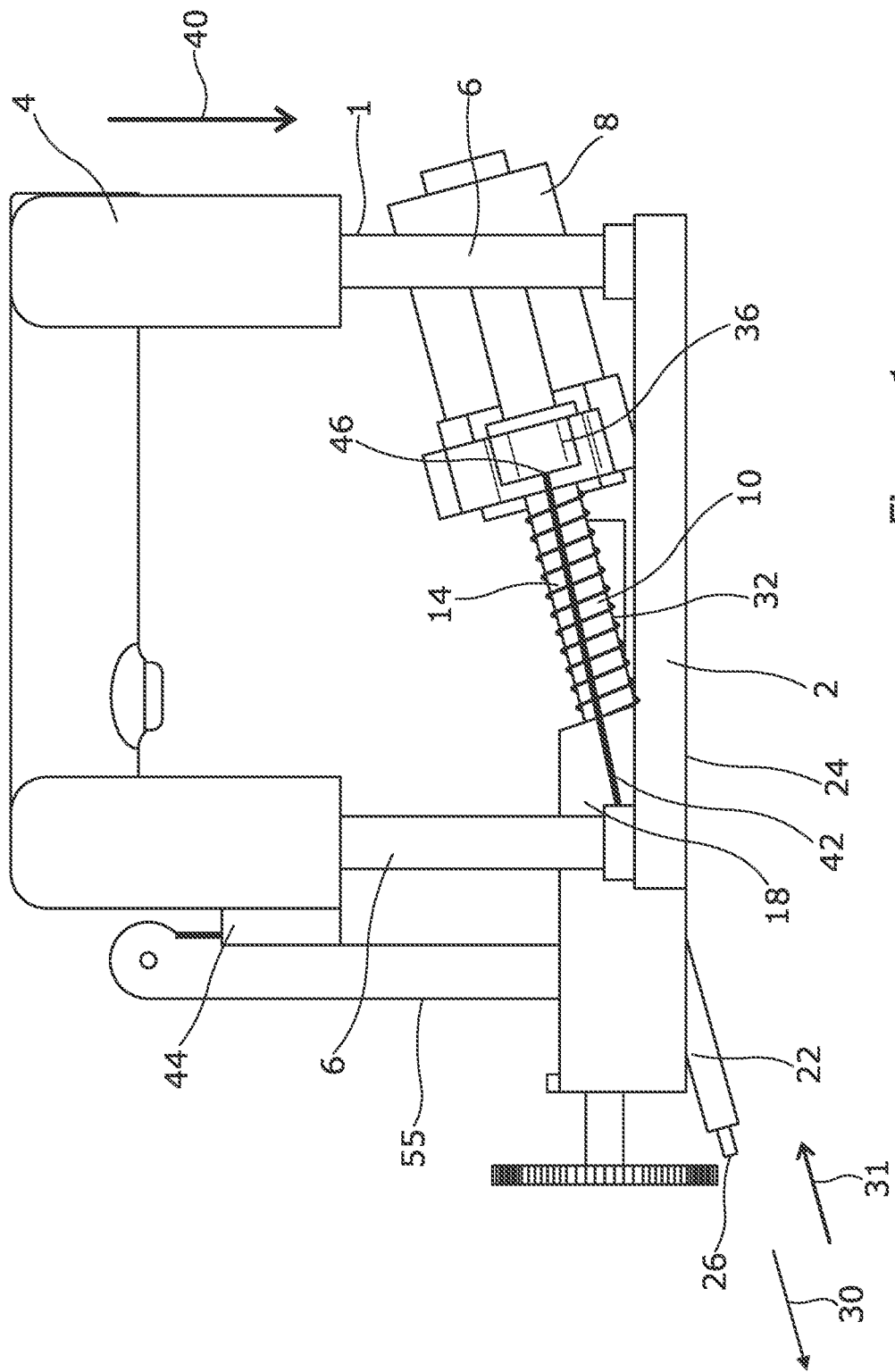
FIG. 1 illustrates an elevation of apparatus in accordance with the invention in one embodiment.
Figure 2:
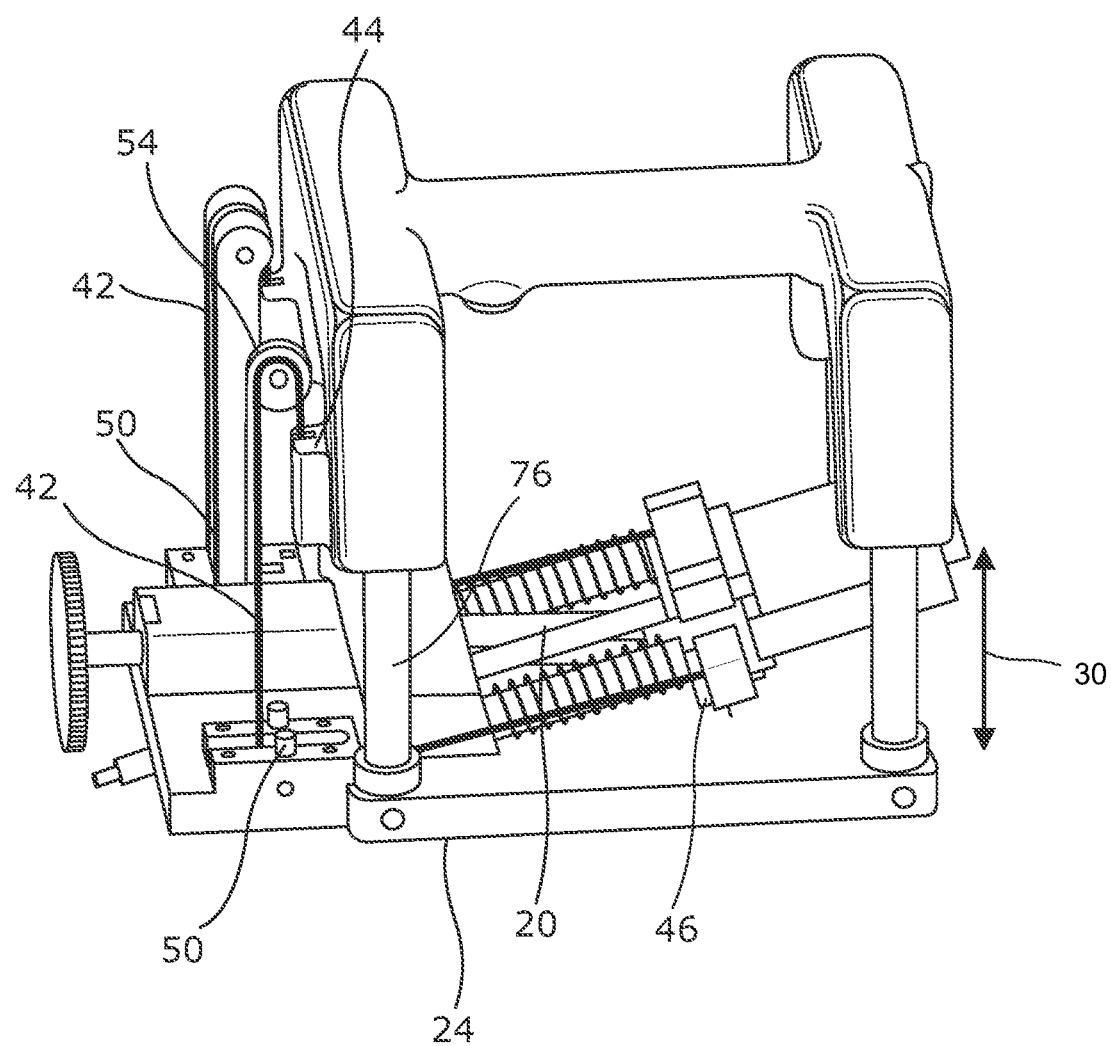
FIG. 2 illustrates a prospective view of apparatus of the embodiment shown in FIG. 1.

Referring firstly to FIGS. 1 and 2, there is illustrated apparatus in accordance with one embodiment of the invention. The apparatus comprises a body 1 comprising a base 2 which, has mounted thereon, actuation means including a gripping means 4 mounted on a series of pillars or legs 6 which depend upwardly from the base portion 2.

Also mounted on the base 2, is a drill assembly 10 which is connected to a drive means in the form of a motor 8 which is raised above the base 2 of the body by guide members 14, 16 which lie at an angle. The guide means extend at an offset angle to the base 2 from a housing 18 to the location of the motor 8.

The motor 8 is connected to drive and rotate a drive shaft 20 provided as part of the drill assembly and the drive shaft lies at an angle substantially parallel with the guide members 14,16 and is located between the same. The drive shaft is connected at the opposing end from the motor to a drill head or bit 26 which when in use to form a channel protrudes through the base 2 as shown in FIG. 1 so that the portion 22 of the drill assembly lies below the underside 24 of the base 2 when the apparatus is in use. When the drill head or bit 26 is driven to rotate about the axis 28, and advanced along said axis 28 in the direction of arrow 30, this results in the formation of a channel 29 in the workpiece 52.

The movement of the drill assembly 10 in the direction of arrows 30 is achieved against the force of biasing means in the form of springs 32, 34 which are located on the respective guide members 14, 16 and which are held in location between the housing 18 of the base and stops 36, 38 which are located at a spaced distance from the housing 18 on the guide members and in a direction towards the motor 8.

In order to move the drill assembly in the direction of the arrow 30, the actuation means gripping means 4 is gripped and moved with respect to the base 2 and, in this embodiment, is moved downwardly as indicated by arrow 40 so that the actuation means slide downwardly along the respective spaced apart legs or pillars 6 in a uniform manner and, as it does so, pulls on one or more connecting members 42 which, in this embodiment are formed of steel wire and are flexible and which have one end 44 located on the actuation means gripping means 4 and pass around a pulley 54 on a member 55 of the base and the opposing end 46 of the connecting member is located on the drill assembly 10 and passes around an intermediate contact point 50 so that the movement of the actuation means acts to pull and move the drill assembly 10 in the direction of the arrow 30.

Typically, when the movement force on the gripping means 4 in the direction of arrow 40 is removed, typically once the channel 29 has been formed, the springs 32, 34 act to move the drill assembly back in the direction of arrow 31 and so withdraw the portion 26 from the workpiece and allow the workpiece to be removed. Typically the portion 26 is moved to a position so that the same is located within the passage 76 within the envelope of the base 2 of the body so as to be protect the same from damage when not in use. In one embodiment biasing means in the form of springs are mounted in one or more of the legs or pillars and which act to raise the gripping means 4 away from the base in the opposite direction to arrow 40 and hence typically provide a synchronised movement of the drill assembly, connecting members 42 and gripping means 4 with respect to the body 1 to move the apparatus to a position ready for subsequent use.

Figure 3:
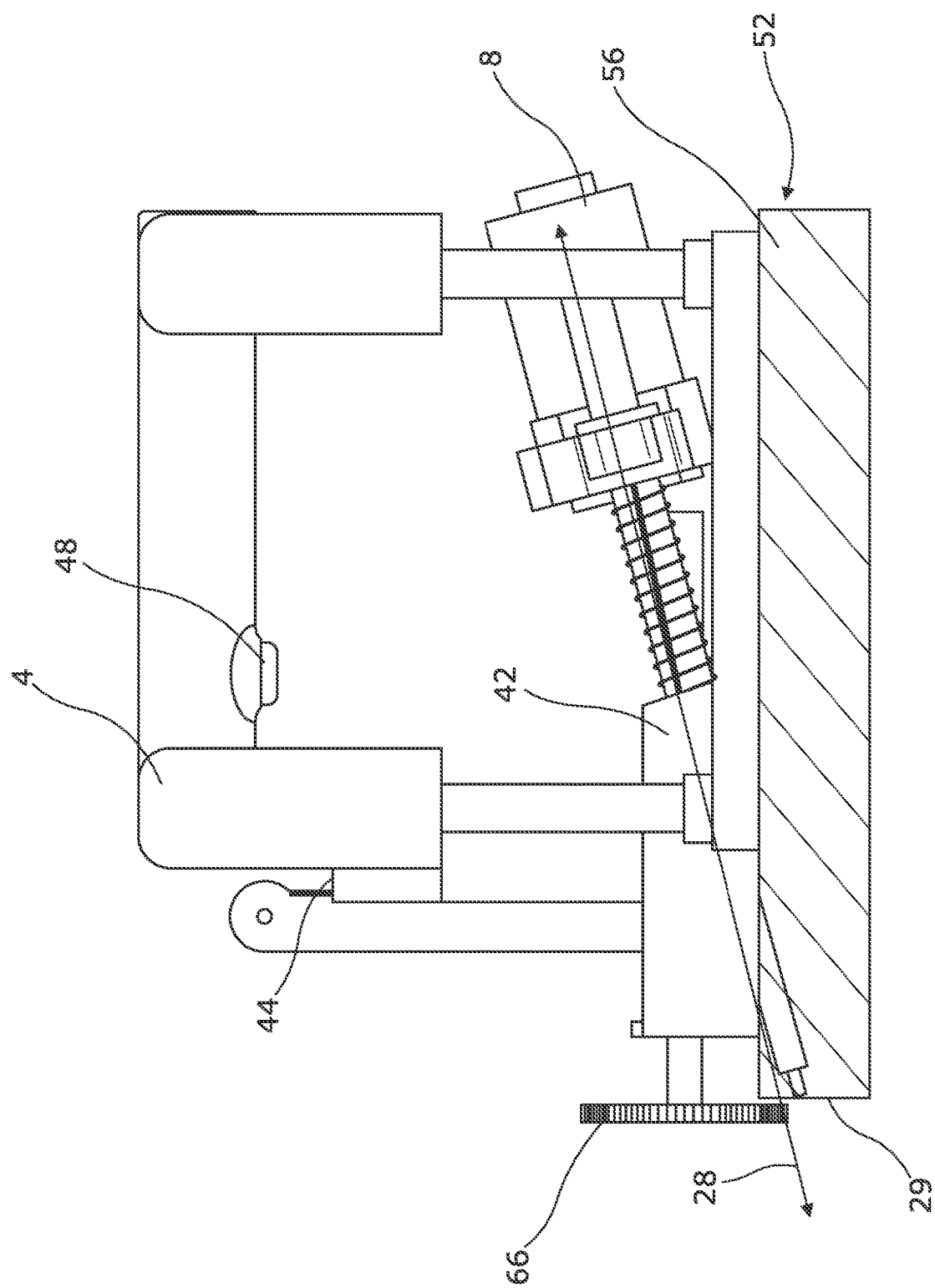
FIG. 3 illustrates the apparatus of FIGS. 1 and 2 with the workpiece in location for use with the apparatus.

At the same time as the advancement of the drill assembly towards and into the workpiece 52, the motor 8 is powered to cause rotation of the shaft and the power is achieved via an electrical connection which is switched on by operating the switch 48. Thus, the movement of the actuation means 4 with respect to the base 2 moves the drill assembly 10 with respect to the base and causes the rotating drill head 26 to move into the workpiece 52 and, as shown in FIG. 3, a channel 29 is then formed by the drill head moving through the workpiece 52 at a predefined and accurate angle. Typically the drive means motor 8 is provided as an integral part of the drill assembly and is moveable therewith in the direction of arrows 30 and 31.

It should be appreciated that although one drill assembly is shown to form one channel at a time, a plurality of drill assemblies may be provided spaced side by side so as to allow a plurality of spaced apart channels to be formed simultaneously in the workpiece 52 using the same operation of a common actuation means.

In one embodiment, the angle of tilt of the rotatable shaft 20, drill head 26 and hence, the channel formed in the workpiece is 15 degrees to the face.

Figure 4A:
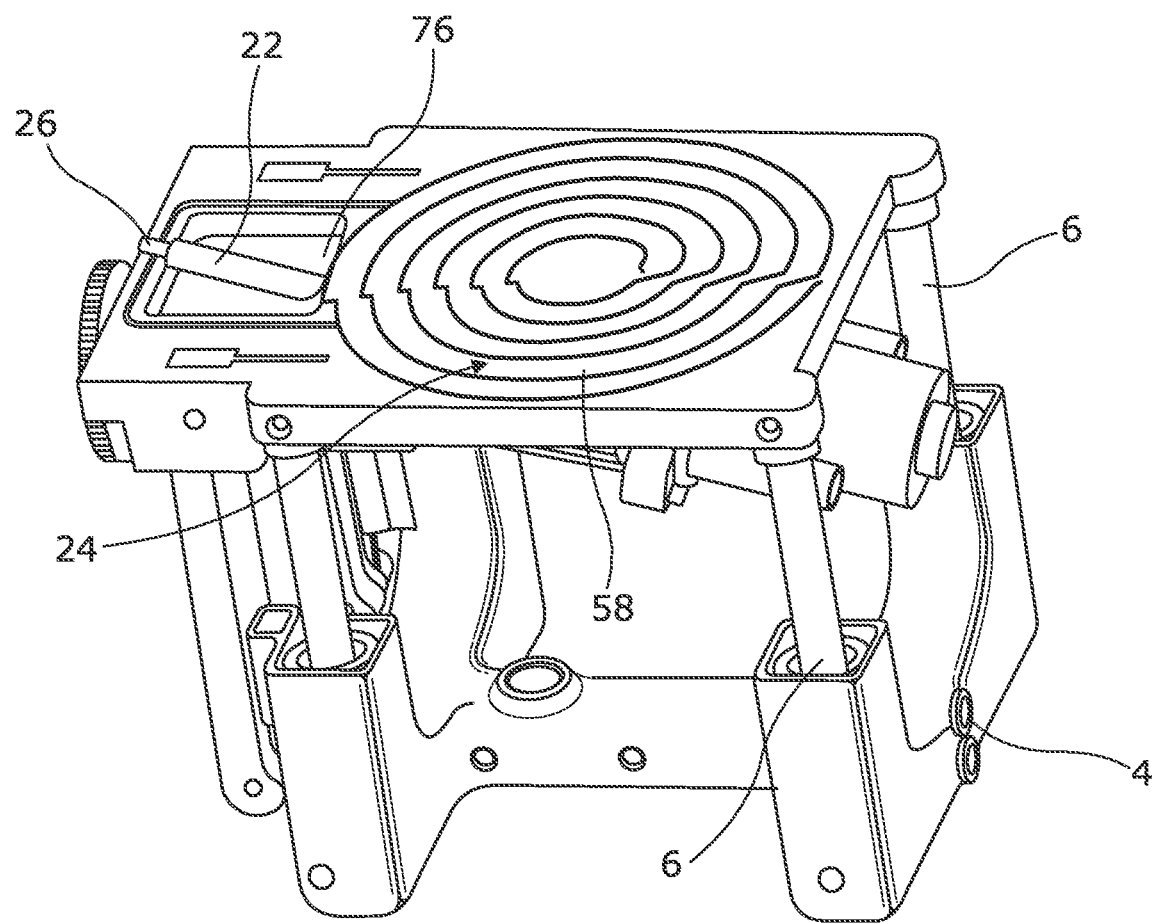
FIGS. 4a and b illustrate the underside of the apparatus in the embodiment shown in FIGS. 1-3.
Figure 4B:
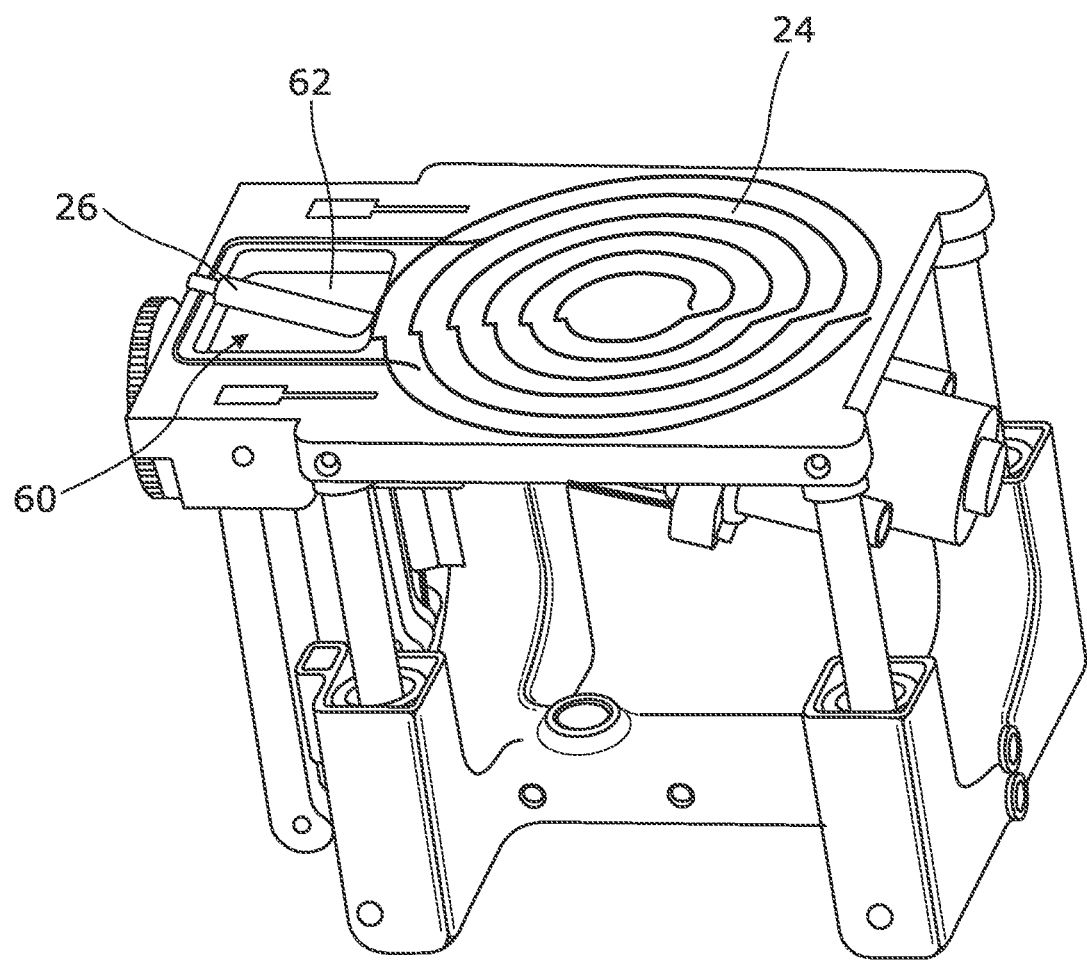

FIGS. 4a and b illustrate the underside 24 of the base in more detail and show how in one embodiment, the base can be formed of a gripping material or includes a gripping material 58 such as rubber which is shown provided in a pattern and may, in one embodiment, be in the form of a rubber string to improve the location of the base of the apparatus with the workpiece 52 and thereby ensure that any movement between the workpiece and apparatus during the channel forming operation is prevented or at least minimised and thereby ensure the accuracy of the channel which is formed in the workpiece.

The underside 24 of the base also includes a portion 60 which, in this embodiment is a recessed portion of the base and is positioned at or adjacent to the location of the base at which the drill head 26 passes through the base of the apparatus to form the channel 29 in the workpiece 52 so that the recessed portion collects dust and debris which is formed during the channel forming operation. This therefore prevents the dust and debris which is created from forcing the base upwardly from the workpiece during the cutting operation. In one embodiment, the recessed portion 60 may be provided with one or more passages 62, to allow removal of dust and debris through the same and act as a chip breaker and prevent blocking or movement of the base with respect to the workpiece and again increases accuracy of the channel which is formed.

Figure 5B:
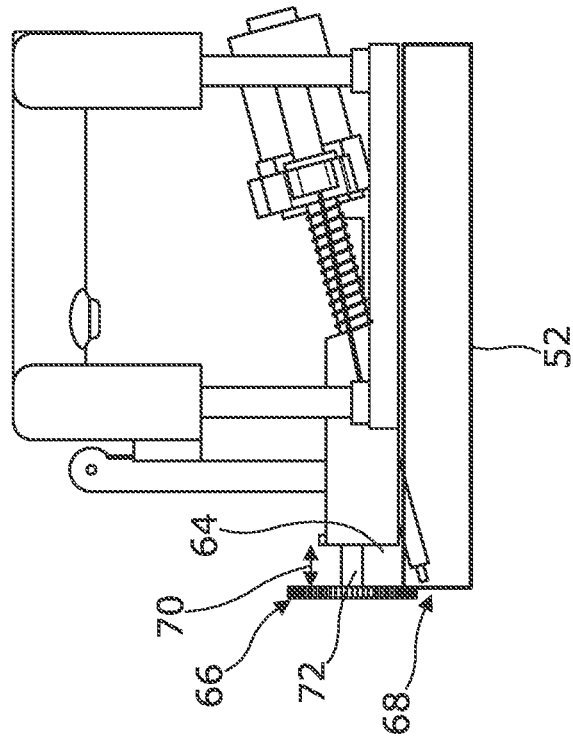
FIGS. 5a and b illustrate the apparatus of the preceding figures illustrating further features of the same.
Figure 5A:
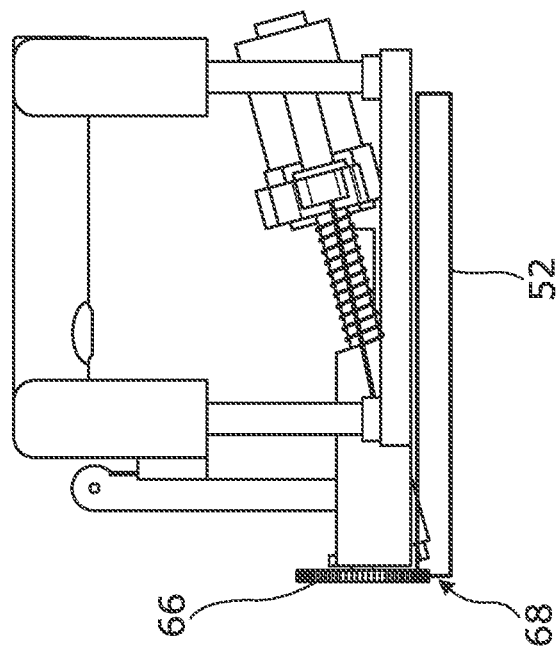

Typically, the apparatus can be adjusted to take into account the thickness of the workpiece on which the channel is to be formed and so allow the apparatus to be range taking whilst ensuring that the required angle and location of formation of the apertures with respect to the workpiece can be achieved. In this embodiment, the positioning of the edge 68 of the workpiece 52 in which the exit aperture of the channel 29 will be formed is adjustable as shown in FIGS. 5a and b. In the FIG. 5a the depth of the workpiece 52 is significantly less than the depth of the workpiece 52 of FIG. 5b. The adjustment is achieved by moving the position of a positioning plate 66 with respect to the end 64 of the base until the positioning plate 66 is at a location which suits the particular known depth of workpiece 52 with which the apparatus is to be used. When the appropriate position has been reached, the workpiece edge 68 is moved so as to engage with the positioning plate 66 and at that point, the user can be sure that the channel 29 which is subsequently formed by movement of the drill assembly 10 and hence drill head 26 into the workpiece 52 will form the required channel 29 at the required location in eth workpiece 52.

In this embodiment, the location of the positioning plate 66 with respect to the base can be adjusted by rotating the same on a threaded shaft 72 located on the base 2, but other adjustment means such as sliding and locking means could alternatively be used to achieve the movement as indicated by arrow 70.

Typically, the apparatus will include a scale or other indicator which will indicate to the user, the required position of the position plate 66 with respect to the depth of the workpiece 52 in which the channel is to be formed.

There is therefore provided in accordance with the invention a portable apparatus which can be used to form channels in a workpiece and the one or more channels can be formed in an accurate and repeatable manner with respect to the workpiece so as to allow a securing means such as a crew to be passed along the channel 29 which is formed and into another workpiece so as to secure the two workpieces together by the formation of a joint which is strong and retains the two workpieces together at a required angle such as 90°.

The invention claimed is:

1. Apparatus for the formation of a channel into a workpiece, said apparatus including a body with a face against which said workpiece is located during use to form said channel, a drill assembly which, when operated, rotates a drill head used to form said channel, and actuation means, wherein said actuation means includes a gripping means portion which is linearly moveable with respect to a base of the body, and one or more connecting members which, when said gripping means is linearly moved in a first direction, cause said drill head to be advanced in a second direction, different to said first direction into said workpiece in a guided manner and said first direction of movement is substantially perpendicular to said face.

2. Apparatus according to claim 1 wherein the drill assembly includes a drill bit which is removably secured to a driveshaft.

3. Apparatus according to claim 2 wherein the drill assembly is moveable relative to the body of the apparatus.

4. Apparatus according to claim 3 wherein a drive means connected to provide rotation to the drive shaft is moveable along with the drill assembly.

5. Apparatus according to claim 1 wherein said channel which is formed enters a first surface of the workpiece and exits through a second surface of the workpiece and said first and second surfaces are substantially perpendicular.

6. Apparatus according to claim 5 wherein the channel is a pocket hole formation.

7. Apparatus according to claim 1 wherein the apparatus includes adjustable positioning means for the workpiece to allow the drill head to enter the workpiece at a selected location.

8. Apparatus according to claim 1 wherein said gripping means is located on legs or pillars which depend upwardly from the base and movement of the gripping means in a direction towards the base causes movement of the connecting members and advancement of the drill assembly towards the workpiece.

9. Apparatus according to claim 1 wherein the gripping means of the actuation means and/or drill assembly is biased so that when a user force is released from the gripping means the biasing means act to withdraw the gripping means and/or drill assembly in a direction away from the workpiece.

10. Apparatus according to claim 9 wherein the drill assembly is biased to a position at which the drill head of the drill assembly is located within a passage in the envelope of the base of the body.

11. Apparatus according to claim 1 wherein the connecting members are flexible with a first end connected to the actuation means and the opposing end connected to the drill assembly and passing around at least one contact location on the base.

12. Apparatus according to claim 11 wherein the at least one contact location includes a pulley wheel located on a member of the body of the apparatus.

13. Apparatus according to claim 1 wherein the underside of a base of the body includes a portion for the collection of dust and debris created during the formation of the channel in the workpiece and said portion includes a passage which allows the movement of said dust and debris from said portion to a location external of the apparatus.

14. Apparatus according to claim 1 wherein the workpiece is located against an underside of a base of the body and said underside includes means to provide a gripping force on the workpiece and assist in maintaining the workpiece in position with respect to the base.

15. Apparatus according to claim 1 wherein the direction of movement of the gripping means to move the drill assembly towards the workpiece is angularly offset to the direction of movement of the drill assembly.

16. Apparatus according to claim 15 wherein the angular offset is between 10° and 80°.

17. Apparatus according to claim 1 wherein the movement of the actuation means is achieved by manual movement of a gripping means of said actuation means of the apparatus with respect to said base, so as to cause one or more flexible connecting members of the actuation means which are positioned intermediate said gripping means and drill assembly to move and advance said drill assembly towards said workpiece.

18. Apparatus according to claim 17 wherein said connecting members engage with drive means which in turn moves the drill assembly.

19. Apparatus according to claim 17 wherein the release of the gripping means allows the gripping means to move to a position in which the connecting members withdraw the drill assembly in a direction away from the workpiece and a drill head of the drill assembly into the base.

* * * * *